US008929697B1

(12) United States Patent  
Conner (10) Patent No.: US 8,929,697 B1  
(45) Date of Patent: Jan. 6, 2015

(54) LIGHT INJECTION SYSTEM (75) Inventor: Arlie Richard Conner, Portland, OR (US)

(73) Assignee: Perceptive Pixel Inc., New York, NY (US)

(*) Notice: Subject to any disclaimer, the term of this patent is extended or adjusted under 35 U.S.C. 154(b) by 406 days.

(21) Appl. No.: 13/083,922

(22) Filed: Apr. 11, 2011

Related U.S. Application Data (60) Provisional application No. 61/322,792, filed on Apr. 9, 2010.

(51) Int. Cl.  
G02B 6/26 (2006.01)  
F21V 7/00 (2006.01)  
F21V 7/05 (2006.01)  
F21V 7/06 (2006.01)  
G02B 6/42 (2006.01)

(52) U.S. Cl.  
USPC ............. 385/31; 362/301; 362/302; 362/551

(58) Field of Classification Search  
None  
See application file for complete search history.

(56) References Cited

U.S. PATENT DOCUMENTS

| | | | | |
|---|---|---|---|---|
| 4,460,939 A * | 7/1984 | Murakami et al. | ............ | 362/609 |
| 6,144,536 A * | 11/2000 | Zimmerman et al. | .......... | 361/31 |
| 6,312,144 B1 * | 11/2001 | Li | ................. | 362/297 |
| 6,356,700 B1 * | 3/2002 | Strobl | ........... | 385/147 |
| 6,953,252 B2 * | 10/2005 | Way | ................ | 353/99 |
| 7,178,948 B2 * | 2/2007 | Gupta | ........... | 362/298 |
| 7,306,352 B2 * | 12/2007 | Sokolov et al. | .............. | 362/341 |
| 7,390,116 B2 * | 6/2008 | Jain | ............... | 362/551 |
| 7,621,677 B2 * | 11/2009 | Yang et al. | ...................... | 385/88 |
| 8,049,839 B2 * | 11/2011 | Han et al. | ........................ | 349/65 |
| 2006/0018125 A1 * | 1/2006 | Miller et al. | .................. | 362/554 |
| 2009/0201469 A1 * | 8/2009 | Vissenberg et al. | ............. | 353/97 |
| 2011/0013418 A1 * | 1/2011 | Kanade et al. | ................ | 362/606 |

* cited by examiner

Primary Examiner — Michelle R Connelly  
(74) Attorney, Agent, or Firm — Brandon Roper; Judy Yee; Micky Minhas

(57) ABSTRACT

A light injection system includes a radiation source, an optical waveguide, and an optical component. The radiation source emits radiation and is oriented relative to the optical waveguide such that a first portion of radiation emitted from the radiation source couples into the optical waveguide as emitted from the radiation source and a second portion of radiation emitted from the radiation source bypasses the optical waveguide as emitted from the radiation source. The optical component redirects at least some of the second portion of radiation emitted from the radiation source that would otherwise bypass the optical waveguide and enables at least some of the redirected radiation to couple into the optical waveguide instead of bypass the optical waveguide.

18 Claims, 6 Drawing Sheets

LIGHT INJECTION SYSTEM

CROSS REFERENCE TO RELATED APPLICATIONS

The present application claims the benefit of U.S. Provisional Application No. 61/322,792, filed Apr. 9, 2010, which is incorporated herein by reference in its entirety for all purposes.

TECHNICAL FIELD

This disclosure relates to light injection systems and, more particularly, systems that inject light into waveguides of frustrated total internal reflection- (FTIR) based touch sensors.

BACKGROUND

Touch sensitive systems refer, in general, to systems that detect and respond to multiple simultaneous points of contact on a surface. Typically, a touch sensitive system is incorporated within an electronic device in the form of a touch screen display that allows a user to both view and manipulate objects using one or more inputs that are in contact with the screen. Examples of electronic devices in which a touch sensitive system has been used include computer tablets, personal digital assistants (PDA), and cell-phones, among others. A variety of techniques are available that enable touch sensitive systems. For example, some touch systems identify surface contact by detecting changes in heat, pressure, capacitance or light intensity.

SUMMARY

Techniques are described for light injection used in, for example, touch-sensitive display devices and frustrated total internal reflection touch sensing technology.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for injecting light from a light source into a waveguide in a manner that causes at least some of the light to undergo total internal reflection within the waveguide. In some implementations, the waveguide may be relatively thin as compared to the light source such that all of the light emitted from the light source cannot directly enter a side of the waveguide. In these implementations, although some light emitted from the light source may directly enter the relatively thin waveguide and undergo total internal reflection, other light from the light source bypasses the waveguide entrance surface and becomes 'stray light' which can interfere with the touch interpretation apparatus. To improve efficiency of injection and to reduce the stray light, one or more optical components may be used to redirect the light so that it can properly enter the waveguide. Multiple types of optical components may be used to achieve such light redirection.

Figure 1:
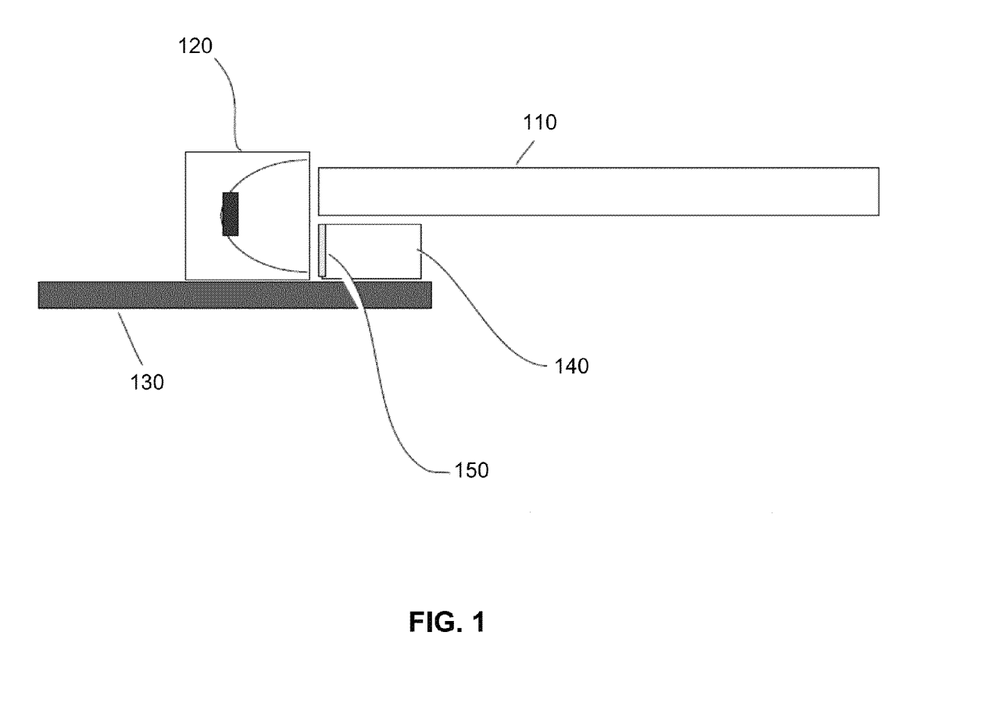
FIG. 1 is a top view of an example light injection system.

FIG. 1 illustrates an example light injection system. The example light injection system shown in FIG. 1 may be part of a touch sensitive device, in which a point of contact with the device is detected based on FTIR. The light injection system includes a waveguide 110, a light source 120, a circuit board 130, a spacer/reflector unit 140, and a reflective surface 150 positioned at one surface of the spacer/reflector unit 140.

The waveguide 110 may be made from a material that is flexible enough to respond to pressure applied by an input and that has a refractive index that allows light to undergo total internal reflection within the waveguide. For instance, the waveguide 110 may be made from materials such as acrylic/polymethylmethacrylate (PMMA), polycarbonate (PC), or polyethylene terephthalate (PET). The waveguide 110 may be an acrylic waveguide that has a thickness of approximately 0.8 mm (800 microns). Other materials and thicknesses can be used as well.

The light source 120 may include multiple light emitting diodes (LEDs), which are arranged directly against an edge of the waveguide 110. Arranging the LEDs in this manner, may maximize direct coupling of electromagnetic radiation (e.g., light) into total internal reflection angular range within the waveguide 110. The LEDs may have a thickness (e.g., 2.5 mm) that is approximately twice the thickness of the waveguide 110.

Other sources of light such as, for example, laser diodes, may be used instead. In some implementations, the light source 120 can be selected to emit radiation in the infrared portion of the electromagnetic spectrum such that it does not interfere with visible radiation if the touch sensor device is integrated into a display.

Some light (e.g., infrared radiation) emitted from light source 120 is directly coupled into the waveguide 110. Due to the refractive index difference between the waveguide 110 and the medium surrounding the waveguide 110, at least some of the coupled light undergoes TIR and proceeds to travel down the waveguide 110. For example, the waveguide 110 may be a thin layer of compliant acrylic surrounded by air. Given the refractive index difference between acrylic (n=1.49) and air (n=1.0), infrared light directly introduced by the light source 120 into the waveguide 110 at any angle of incidence propagates within and along the acrylic layer by TIR.

Although about half of the light emitted from the light source 120 directly enters and couples into the waveguide 110, the other half of the light emitted from the light source 120 does not directly enter the side of the waveguide 110 because the light source is thicker than the waveguide 110. Accordingly, this other half of light would not enter the waveguide 110 and would be wasted, unless it is otherwise redirected back to the waveguide 110.

The spacer/reflector unit 140 includes a reflective surface 150 that reflects at least some of the lower half of light from the light source 120 back into the light source 120. This causes at least some of the reflected light to reflect toward the waveguide 110, enter the side of the waveguide 110, and couple into the waveguide 110. Specifically, in the example shown in FIG. 1, the light source 120 is an LED that includes an LED chip positioned inside of a reflective parabolic cup.

As such, when light (e.g., infrared radiation) reflects off the reflective surface 150 and back into the reflective parabolic cup, the reflective parabolic cup causes at least some of the light to reflect toward the side of the waveguide 110 and couple into the waveguide 110. In this regard, the reflective surface 150 reduces the amount of light wasted and increases the efficiency of coupling light emitted from the light source 120 into the waveguide 110.

The reflective surface 150 may be a silver or aluminum mirror, a mylar mirror, a diffuse reflector, or any other type of reflector. The higher the reflectivity of the reflective surface 150 the better the recycled light efficiency achieved.

The reflective surface 150 may be attached or deposited on the spacer/reflector unit 140. For example, a body of the spacer/reflector unit 140 may be an opaque material that absorbs stray light that is not being coupled into the waveguide. In this example, the spacer/reflector unit 140 may be made of opaque plastic and the reflective surface 150 may be attached to the appropriate surface of the spacer/reflector unit 140 to reflect light back toward the light source 120.

The reflective surface 150 also may be an integral part of the spacer/reflector unit 140. For instance, the spacer/reflector unit 140 may be made entirely of a reflective material and the reflective surface 150 may be a surface of the reflective material.

In some implementations, the spacer/reflector unit 140 may not be needed to support the waveguide 110. In these implementations, the reflective surface 150 may be included alone without the body portion of the spacer/reflector unit 140. For instance, the reflective surface 150 may be a thin film layer glued directly onto the light source 120 for support.

The circuit board 130 is a printed circuit board to which the light source 120 is mounted. The circuit board 130 provides electrical signals to the light source 120 to control the light source 120. The spacer/reflector unit 140 also is attached to the circuit board 130 and supports the waveguide 110 in a manner that is spaced apart from the circuit board 130.

In some examples, the waveguide 110 may be adhered directly to the circuit board 130 and the spacer/reflector unit 140 with the reflective surface 150 may be simply a reflective surface positioned above the waveguide 110. In these examples, the waveguide 110 would be positioned below the center of the light source 120, instead of above the center of the light source 120 as shown in FIG. 1. This type of configuration may ease manufacturing and reduce costs because the spacer is not needed. However, this type of configuration may not be able to yield as flush of a top surface as the configuration shown in FIG. 1 because the waveguide 110 would be positioned below the center of the light source 120.

Figure 2:
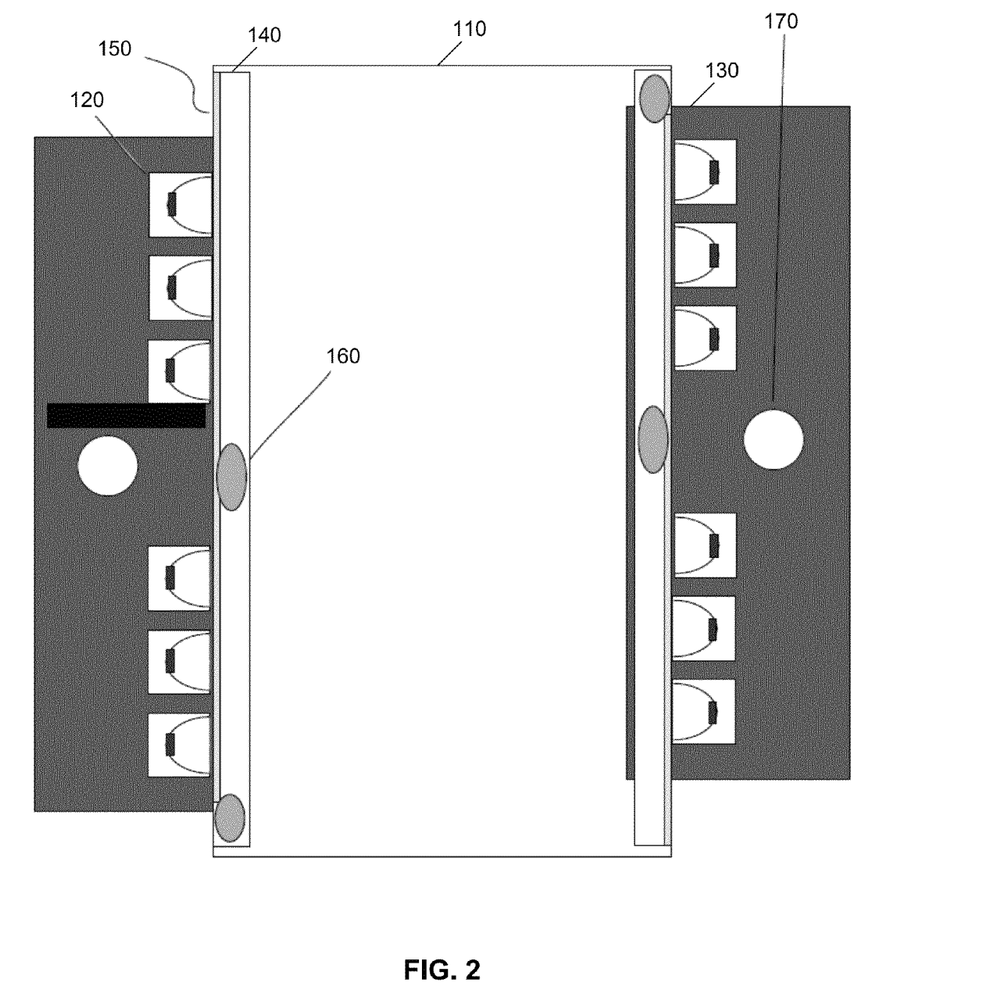
FIG. 2 is a back view of an example light injection system.

FIG. 2 illustrates the example light injection system shown in FIG. 1 from a top or bottom view. The example light injection system includes the waveguide 110, the light source 120, the circuit board 130, the spacer/reflector unit 140, the reflective surface 150, an adhesive 160, and thru-holes 170. As shown, the adhesive 160 (e.g., glue or double stick tape) is placed at gaps between the light sources 120 (e.g., gaps between the LEDs) where no light is being injected into the waveguide 110. The spacer/reflector unit 140 itself is adhered (e.g., glued or taped) to the circuit board 130, so the pieces become a rugged and semi-rigid assembly. A thin piece of double stick adhesive may extend along the length of the spacer/reflector unit 140, so the spacer/reflector unit 140 is tightly secured to the circuit board 130. The same double stick adhesive may be used between the spacer/reflector unit 140 and the waveguide 110 to affix the waveguide 110 to the spacer/reflector unit 140. The thru-holes 170 in the circuit board facilitate solid mounting to the device frame.

The example light injection system shown in FIGS. 1 and 2 may provide a flush top surface, with high efficiency light coupling, and ease of manufacture. In this regard, thinner waveguides may be used with high efficiency light coupling and relatively low cost. The use of thinner waveguides may provide a more pleasing user experience and reduce a thickness of touch-screen displays.

Figure 3:
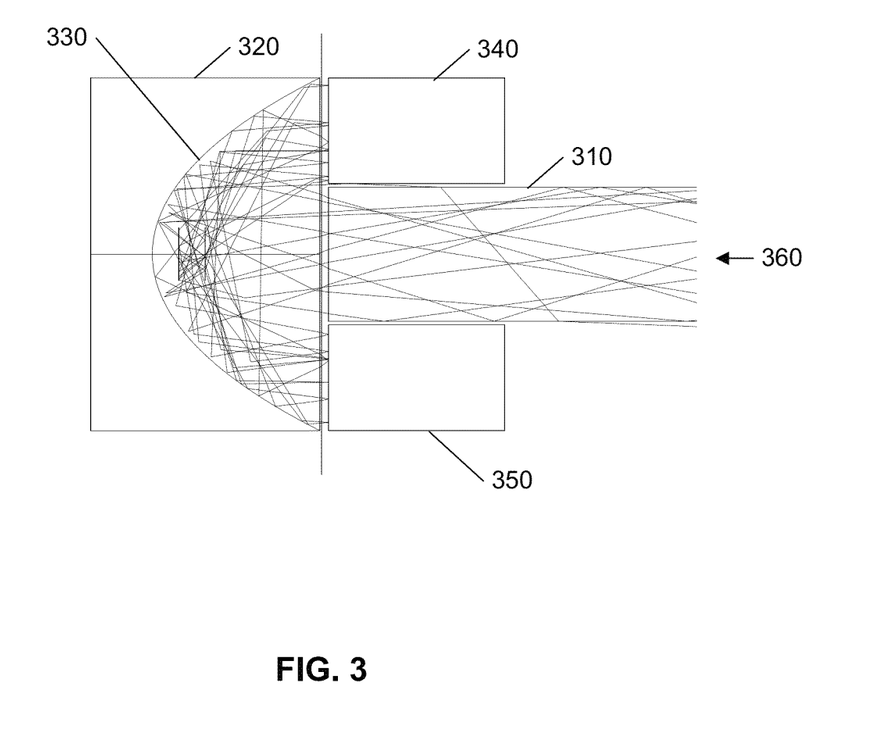
FIG. 3 is a top view of an example light injection system.

FIG. 3 illustrates another example light injection system. As shown, the light injection system includes a waveguide 310, a light source 320, a reflective cup 330, a first spacer/reflector unit 340, and a second spacer/reflector unit 350. The waveguide 310 may be similar to the waveguide 110 discussed above with respect to FIG. 1 and the light source 320 may be similar to the light source 120 discussed above with respect to FIG. 1. The reflective cup 330 is included in the light source 320 and causes light to reflect back out of a front opening of the light source 320. As shown, the reflective cup 330 has a parabolic shape.

The first spacer/reflector unit 340 and the second spacer/reflector unit 350, each may be similar to the spacer/reflector unit 140 discussed above with respect to FIG. 1. In the example shown in FIG. 3, the first spacer/reflector unit 340 and the second spacer/reflector unit 350 sandwich the waveguide 310 and reflect light that would otherwise escape above and below the waveguide 310 back into the light source 320 and, ultimately, into the waveguide 310. Ray traces 360 illustrate rays of light being reflected off the first spacer/reflector unit 340 and the second spacer/reflector unit 350, back to the reflective cup 330, and into the waveguide 310. The example light injection system shown in FIG. 1 may have a similar ray tracing pattern, but only for one half of the waveguide 110.

The example light injection system shown in FIG. 3 may experience higher light coupling efficiency than the example light injection system shown in FIG. 1 because the central portion of light source 320 is positioned at the input face of the waveguide 310. However, the example light injection system shown in FIG. 3 may have increased manufacturing costs as compared to the example light injection system shown in FIG. 1 because two spacer/reflector units are needed and the waveguide 310 is positioned between the two spacer/reflector units. In addition, the example light injection system shown in FIG. 3 may have not have as flush of a top surface as the example light injection system shown in FIG. 1 because a spacer/reflector unit is needed on top of the waveguide 310.

Figure 4:
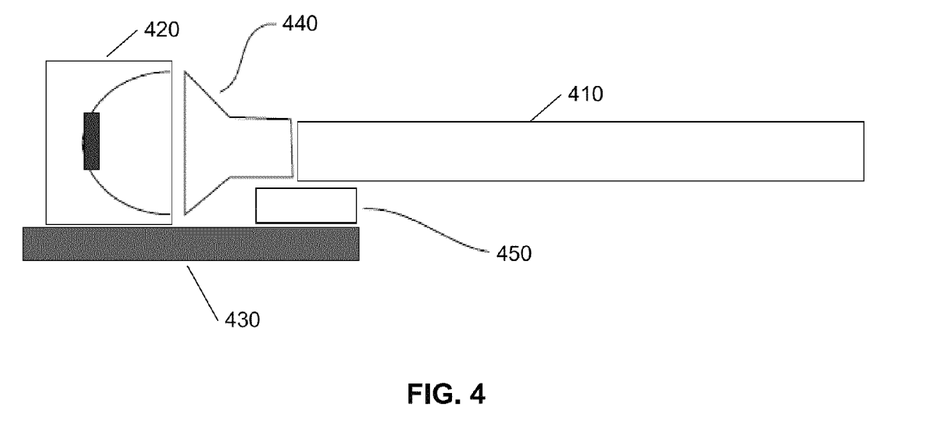
FIG. 4 is a top view of an example light injection system.

FIG. 4 illustrates another example light injection system. As shown, the light injection system includes a waveguide 410, a light source 420, a circuit board 430, a recycling funnel 440, and a support plate 450. The waveguide 410, the light source 420, and the circuit board 430 may be similar to the waveguide 110, the light source 120, and the circuit board 130 discussed above with respect to FIG. 1. The recycling funnel 440 reflects light that would not enter the face of the waveguide 410 back to the light source 420. Specifically, light hitting a first sloped portion of the recycling funnel 440 undergoes TIR and is directed ninety degrees toward to a second sloped portion of the recycling funnel 440. When the redirected light reaches the second sloped portion of the recycling funnel 440, it undergoes TIR again and is directed back into the light source 420.

In the example shown in FIG. 4, the light source 420 is an LED that includes an LED chip positioned inside of a reflective parabolic cup. As such, when light (e.g., infrared radiation) returns to the light source 420, the reflective parabolic cup causes at least some of the light to reflect back toward the side of the waveguide 410 and couple into the waveguide 410. In this regard, the recycling funnel 440 reduces the amount of stray light and increases the efficiency of coupling light emitted from the light source 420 into the waveguide 410.

The recycling funnel 440 may be made of molded acrylic, polycarbonate, or any other suitable material that has an appropriate index of refraction. The support plate 450 may be an opaque material (e.g., an opaque plastic) that absorbs stray light that is not being coupled into the waveguide. The support plate 450 supports the waveguide 410 and the recycling funnel 440 at an interface where the waveguide 410 and the recycling funnel 440 meet.

Figure 5:
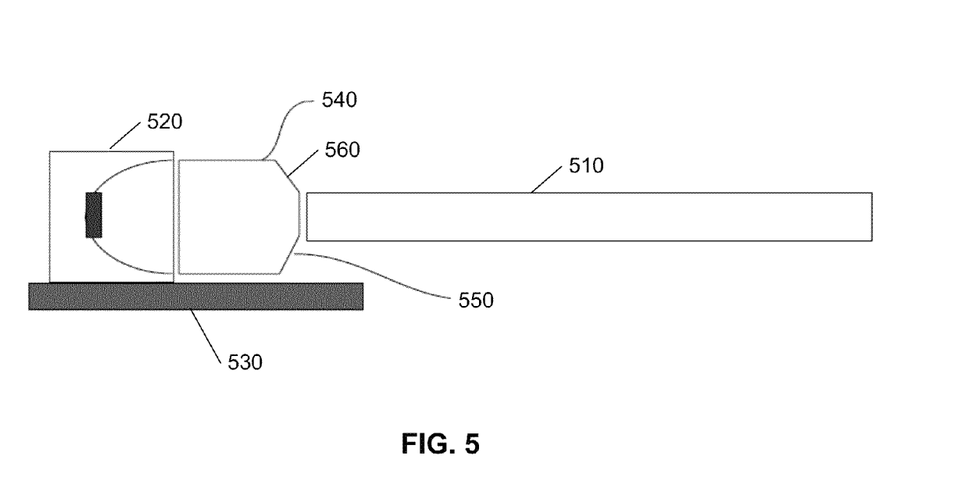
FIG. 5 is a top view of an example light injection system.

FIG. 5 illustrates another example light injection system. As shown, the light injection system includes a waveguide 510, a light source 520, a circuit board 530, and a recycling box 540 with reflective surfaces 550 and 560. The waveguide 510, the light source 520, and the circuit board 530 may be similar to the waveguide 110, the light source 120, and the circuit board 130 discussed above with respect to FIG. 1. The recycling box 540 reflects light that would not enter the face of the waveguide 510 back to the light source 520. Specifically, light hitting a first reflective surface 550 of the recycling box 540 is reflected ninety degrees toward to a second reflective surface 560 of the recycling box 540. When the reflected light reaches the second reflective surface 560 of the recycling box 540, it is reflected again and is directed back into the light source 520. For light hitting the second reflective surface 560 first, the light would be reflected to the first reflective surface 550 and then reflected by the first reflective surface 550 back into the light source 520.

In the example shown in FIG. 5, the light source 520 is an LED that includes an LED chip positioned inside of a reflective parabolic cup. As such, when light (e.g., infrared radiation) returns to the light source 520, the reflective parabolic cup causes at least some of the light to reflect back toward the side of the waveguide 510 and couple into the waveguide 510. In this regard, the recycling box 540 reduces the amount of stray light and increases the efficiency of coupling light emitted from the light source 520 into the waveguide 510.

The recycling box 540 may be made of molded acrylic, polycarbonate, or any other suitable material that has an appropriate index of refraction and accommodates reflective surfaces. The reflective surfaces 550 and 560 may be polished and mirrored faces that reflect light emitted by the light source 520.

Figure 6:
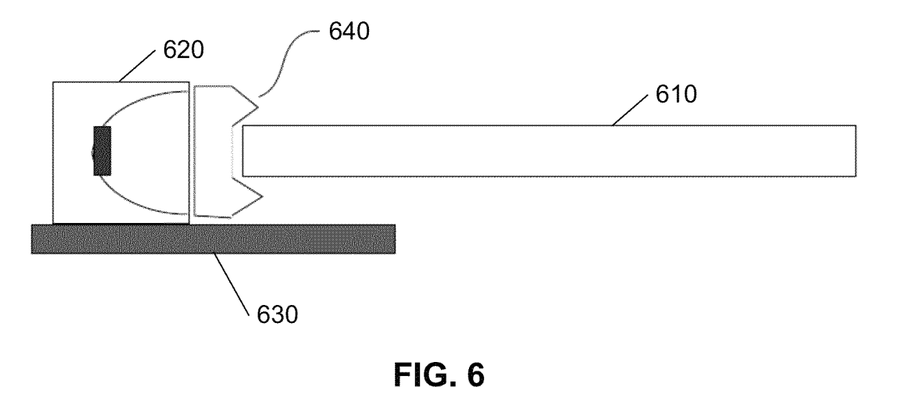
FIG. 6 is a top view of an example light injection system.

FIG. 6 illustrates another example light injection system. As shown, the light injection system includes a waveguide 610, a light source 620, a circuit board 630, and a recycling box 640 that includes retroreflecting prism structures. The waveguide 610, the light source 620, and the circuit board 630 may be similar to the waveguide 110, the light source 120, and the circuit board 130 discussed above with respect to FIG. 1. The recycling box 640 reflects light that would not enter the face of the waveguide 610 back to the light source 620. Specifically, the recycling box 640 includes retroreflecting prism structures that sandwich the waveguide 610 and cover areas where light emitted by the light source 620 does not directly enter the face of the waveguide 610. By this configuration, light hitting one of the retroreflecting prism structures is reflected back into the light source 620.

In the example shown in FIG. 6, the light source 620 is an LED that includes an LED chip positioned inside of a reflective parabolic cup. As such, when light (e.g., infrared radiation) returns to the light source 620, the reflective parabolic cup causes at least some of the light to reflect back toward the side of the waveguide 610 and couple into the waveguide 610. In this regard, the recycling box 640 reduces the amount of stray light and increases the efficiency of coupling light emitted from the light source 620 into the waveguide 610.

The recycling box 640 may be made of molded acrylic, polycarbonate, or any other suitable material that has an appropriate index of refraction and accommodates retroreflecting prism structures.

A number of implementations have been described. Nevertheless, it will be understood that various modifications may be made.

In some of the disclosed implementations, frustrated total internal reflection-(FTIR) based touch sensors may be used, and touch events may be registered based on changes in light observed by one or more image sensors that result from light escaping from the FTIR-based touch sensors as a consequence of contact being made with the waveguide by appropriate input mechanisms, such as, for example, fingers. Any type of FTIR-based touch sensor that would benefit from a thin waveguide may be used. For example, the light injection systems and technology described throughout this disclosure may be applied to the FTIR-based touch sensors described in co-pending, commonly owned U.S. Provisional Patent Application Ser. No. 61/182,992 and the corresponding utility patent application, entitled "Touch Sensing," filed Apr. 9, 2010, and assigned U.S. patent application Ser. No. 12/757,693, both of which are incorporated herein by reference in their entireties. In addition, the light injection systems and technology described throughout this disclosure may be applied to the FTIR-based touch sensors described in co-pending, commonly owned U.S. Provisional Patent Application Ser. No. 61/182,984 and the corresponding utility patent application, entitled "Touch Sensing," filed Apr. 9, 2010, and assigned U.S. patent application Ser. No. 12/757,937, both of which are incorporated herein by reference in their entireties.

It will be understood that various modifications may be made. For example, other useful implementations could be achieved if components in the disclosed systems were combined in a different manner and/or replaced or supplemented by other components. Accordingly, other implementations are within the scope of the disclosure.

What is claimed is:

1. A device comprising:
an optical waveguide having an input face, the optical waveguide configured to receive radiation and to cause at least some radiation to undergo total internal reflection within the optical waveguide;
a radiation source configured to emit radiation and oriented relative to the optical waveguide such that a first portion of radiation emitted from the radiation source couples into the optical waveguide as emitted from the radiation source and a second portion of radiation emitted from the radiation source bypasses the optical waveguide as emitted from the radiation source;
an optical component including a first spacer/reflector unit having a first reflective surface configured to redirect at least some of the second portion of radiation emitted from the radiation source that would otherwise bypass the optical waveguide back into the radiation source and enable at least some of the redirected radiation to couple into the optical waveguide instead of bypass the optical waveguide, the first reflective surface being coplanar with the input face of the optical waveguide, the first reflective surface being flush with the input face of the optical waveguide across an entire width of the first reflective surface, an output width of the radiation source being at least twice as wide as the entire width of the first reflective surface; and an opaque spacer unit that is configured to support the optical waveguide and absorb at least some stray radiation emitted by the radiation source that does not couple into the optical waveguide.

2. The device of claim 1, wherein the output width of the radiation source is greater than a width of an edge of the optical waveguide through which radiation emitted by the radiation source couples into the optical waveguide.

3. The device of claim 2, wherein the output width of the radiation source is at least twice as wide as the width of the edge of the optical waveguide through which radiation emitted by the radiation source couples into the optical waveguide.

4. The device of claim 1, wherein the optical component is configured to perform a first redirection of at least some of the second portion of radiation that causes radiation to redirect back toward the radiation source and the radiation source is configured to perform a second redirection of at least some of the redirected radiation that causes radiation to redirect back toward the optical waveguide.

5. The device of claim 4, wherein the radiation source comprises a reflective parabolic cup that is configured to perform the second redirection of at least some of the redirected radiation that causes radiation to redirect back toward the optical waveguide.

6. The device of claim 1, wherein the first reflective surface reflects at least some of the second portion of radiation emitted from the radiation source that would otherwise bypass the optical waveguide.

7. The device of claim 6, wherein the radiation source comprises a reflective parabolic cup, an edge of the optical waveguide is positioned adjacent to a first portion of the reflective parabolic cup such that radiation exiting the first portion of the reflective parabolic cup directly enters the edge of the optical waveguide and couples into the optical waveguide, and the first reflective surface is positioned adjacent to a second portion of the reflective parabolic cup such that radiation exiting the second portion of the reflective parabolic cup reflects back into the reflective parabolic cup.

8. The device of claim 7, wherein the first spacer/reflector unit provides support for the optical waveguide.

9. The device of claim 1, wherein:
the optical component further comprises a second spacer/reflector unit having a second reflective surface that reflects some of the second portion of radiation emitted from the radiation source that would otherwise bypass the optical waveguide;
the radiation source comprises a reflective parabolic cup;
an edge of the optical waveguide is positioned adjacent to a central portion of the reflective parabolic cup such that radiation exiting the central portion of the reflective parabolic cup directly enters the edge of the optical waveguide and couples into the optical waveguide; and
the first and second reflective surfaces are positioned adjacent to the reflective parabolic cup on opposite sides of the optical waveguide such that radiation exiting the reflective parabolic cup above or below the central portion reflects back into the reflective parabolic cup.

10. The device of claim 1, wherein the optical component comprises a recycling funnel that redirects at least some of the second portion of radiation emitted from the radiation source that would otherwise bypass the optical waveguide.

11. The device of claim 10, wherein the radiation source comprises a reflective parabolic cup, the recycling funnel is positioned adjacent to the reflective parabolic cup such that radiation exiting the reflective parabolic cup directly enters the recycling funnel and couples into the recycling funnel, and an edge of the optical waveguide is positioned adjacent to a central portion of the recycling funnel such that radiation exiting the central portion of the recycling funnel directly enters the edge of the optical waveguide and couples into the optical waveguide.

12. The device of claim 11, wherein the opaque spacer unit is positioned at an interface between the recycling funnel and the optical waveguide, the opaque spacer unit providing support for the recycling funnel.

13. The device of claim 1, wherein the optical component comprises a recycling box that redirects at least some of the second portion of radiation emitted from the radiation source that would otherwise bypass the optical waveguide.

14. The device of claim 13, wherein the radiation source comprises a reflective parabolic cup, the recycling box is positioned adjacent to the reflective parabolic cup such that radiation exiting the reflective parabolic cup directly enters the recycling box and couples into the recycling box, an edge of the optical waveguide is positioned adjacent to a central portion of the recycling box such that radiation exiting the central portion of the recycling box directly enters the edge of the optical waveguide and couples into the optical waveguide, and the recycling box has reflective surfaces that reflect radiation that is within the recycling box, but outside of the central portion, back into the reflective parabolic cup.

15. The device of claim 13, wherein the radiation source comprises a reflective parabolic cup, the recycling box is positioned adjacent to the reflective parabolic cup such that radiation exiting the reflective parabolic cup directly enters the recycling box and couples into the recycling box, an edge of the optical waveguide is positioned adjacent to the central portion of the recycling box such that radiation exiting the central portion of the recycling box directly enters the edge of the optical waveguide and couples into the optical waveguide, and the recycling box has retro-reflecting prisms that reflect radiation that is within the recycling box, but outside of the central portion, back into the reflective parabolic cup.

16. The device of claim 1, wherein the radiation source is positioned at an edge of the optical waveguide and oriented such that the first portion of radiation emitted from the radiation source directly enters the edge of the optical waveguide and couples into the optical waveguide and the second portion of radiation emitted from the radiation source bypasses the edge of the optical waveguide.

17. The device of claim 1, wherein the radiation source is an infrared light emitting diode configured to emit infrared light.

18. The device of claim 1, wherein the radiation source is an infrared light emitting diode chip that is configured to emit infrared light and that is positioned in a reflective parabolic cup.

* * * * *